Figure 1:
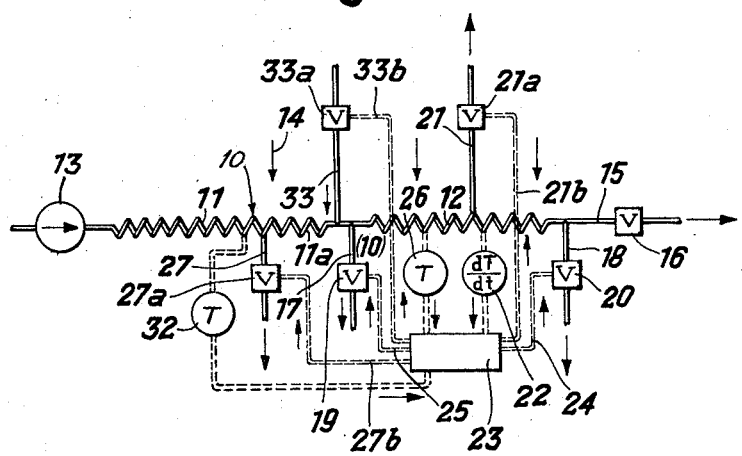

Sept. 3, 1963 P. PROFOS 3,102,513
METHOD AND APPARATUS FOR CONTROLLING RATE OF TEMPERATURE
CHANGES OF HEAT GENERATORS DURING STARTUP AND SHUTDOWN
Filed Aug. 19, 1959 7 Sheets-Sheet 1

Inventor:
PAUL PROFOS

Inventor:
PAUL PROFOS

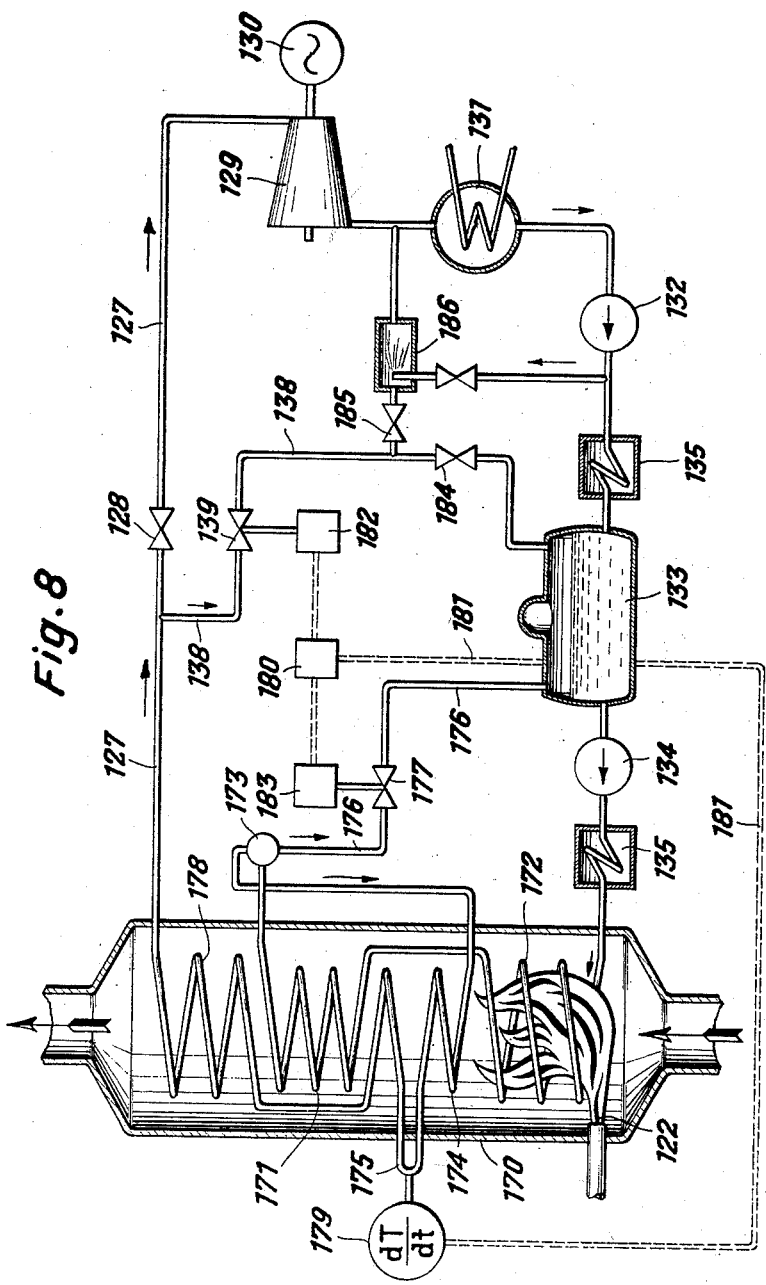

United States Patent Office 3,102,513
Patented Sept. 3, 1963

3,102,513
METHOD AND APPARATUS FOR CONTROLLING RATE OF TEMPERATURE CHANGES OF HEAT GENERATORS DURING STARTUP AND SHUTDOWN
Paul Profos, Winterthur, Switzerland, assignor to Sulzer Freres, Societe Anonyme, Winterthur, Switzerland
Filed Aug. 19, 1959, Ser. No. 834,683
Claims priority, application Switzerland Sept. 4, 1958
5 Claims. (Cl. 122—406)

This invention relates to a method and apparatus for controlling the rate of temperature change in different sections of heat transfer or exchange systems during startup and shutdown, particularly heat transfer or exchange systems having wall parts bathed by a flowing medium the temperature of which varies and which serves for heating and for cooling different parts of the heat transfer system.

When starting up steam generators and, especially, when shutting them down, it is known to allow a cooling medium to flow through the tube system or at least through a part thereof, in order to control the cooling of the parts heated during operation, more especially those parts in the radiation zone, for the purpose of protecting the material composing those parts and to carry off the heat radiated from the heated chamber walls in the radiation zone, which radiation continues to act on those parts after the extinction of the fire. In the start-up of an ordinary steam generator the amount of water being circulated is customarily adjusted as a function of a temperature, usually a temperature measured at the output end of the evaporating section of the boiler. Consequently the amount of working substance flowing through those portions of the boiler downstream of the evaporator is not adjusted to the variation in time rate of temperature change occurring in those downstream heating surfaces. In accordance with the invention such surfaces are protected by the provision of suitable coolant flow irrespective of the main control of circulating water. Moreover the invention permits acceleration of the start-up process by control of the rate of flow of working substance over such downstream surfaces at values corresponding or nearly corresponding to the maximum time rate of change of temperature which can be tolerated by those surfaces.

The method according to the invention comprises effecting controlled discharge of a fluid medium from the tube system both upstream and downstream of a particular part thereof, which part may constitute a wall lining of the boiler, whereby the rate of temperature change of that particular part of the tube system is controlled by varying the rate of discharge of the medium both upstream and downstream of the part according to the temperature (T) and/or the time rate of change of temperature $(dT/dt)$, which quantity is measured at a predetermined location in that part of the tube system. The discharge is so effective that the quantity remains within predetermined positive or negative limits.

Figure 2:
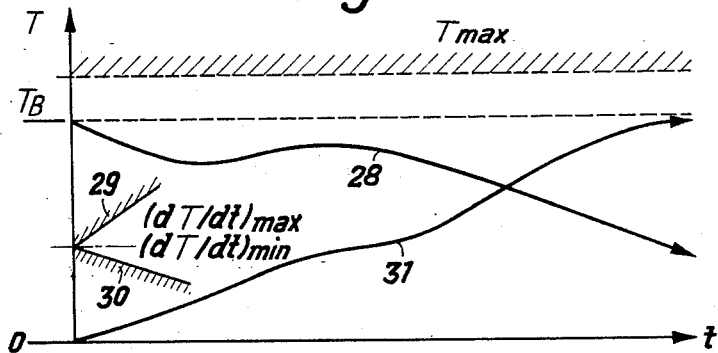
Figure 3:
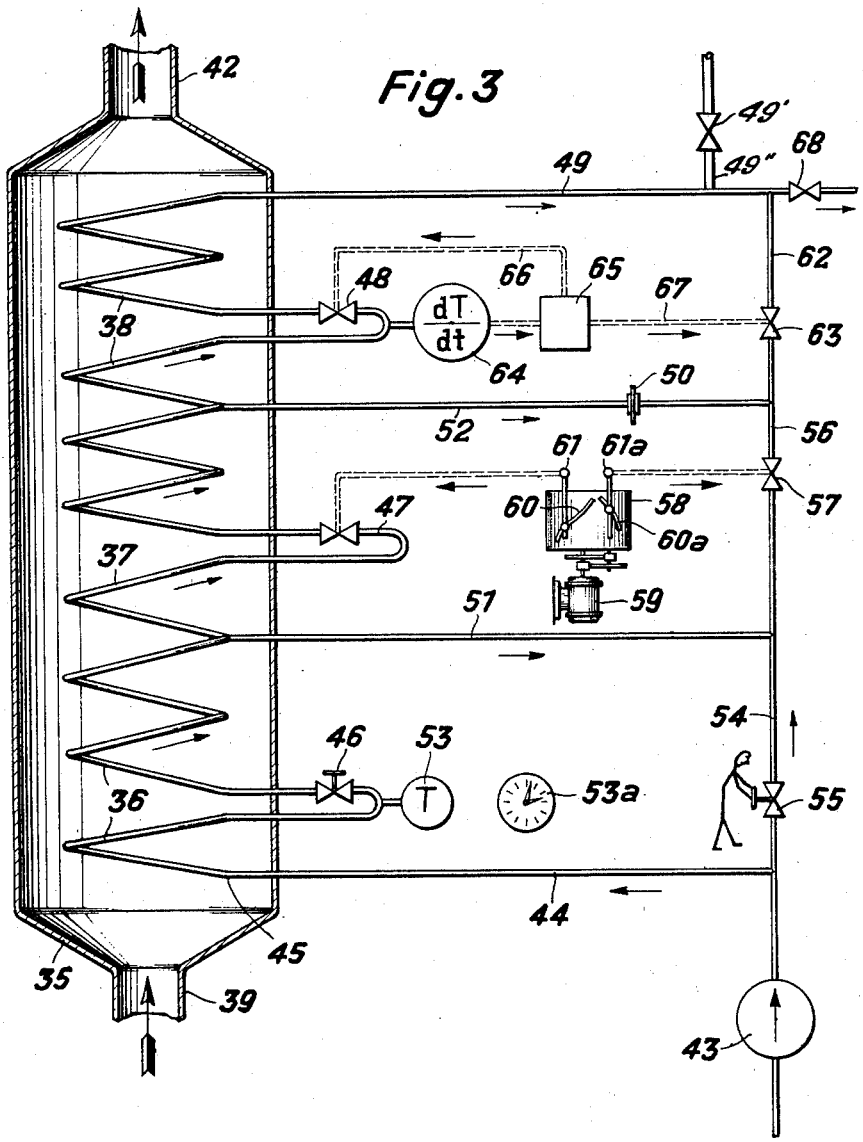
Figure 4:
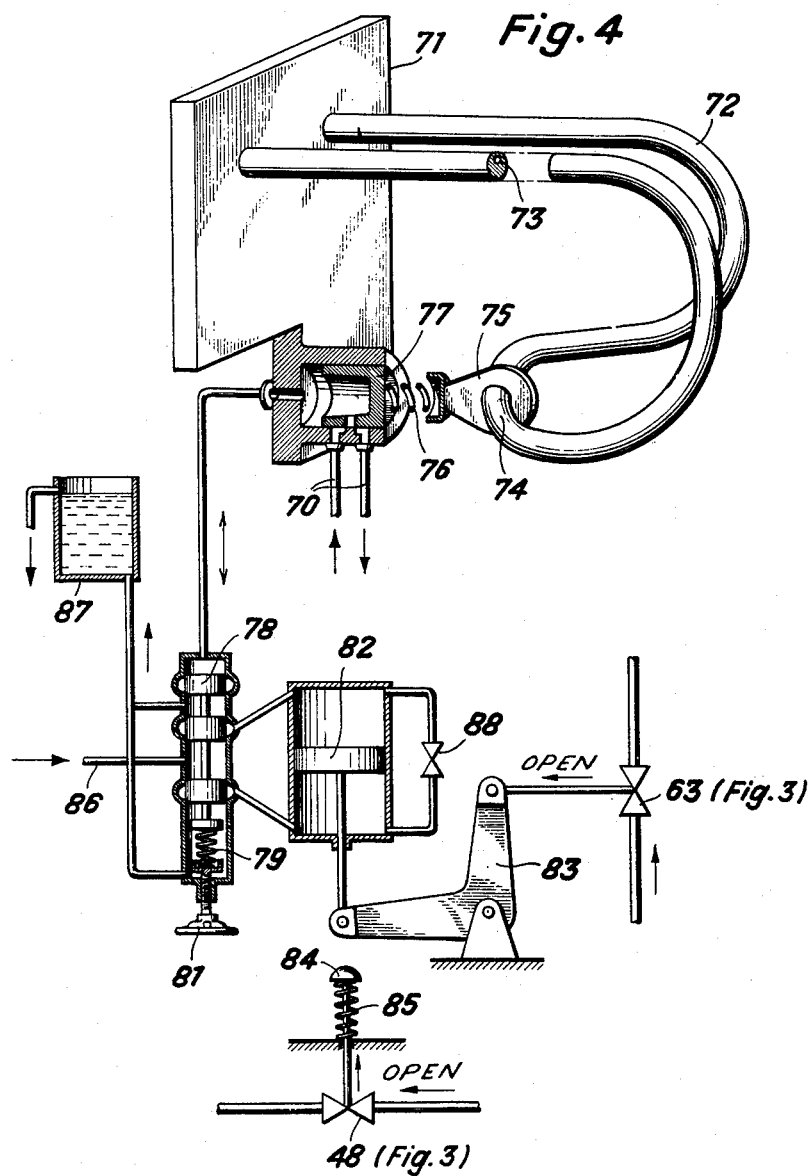
Figure 5:
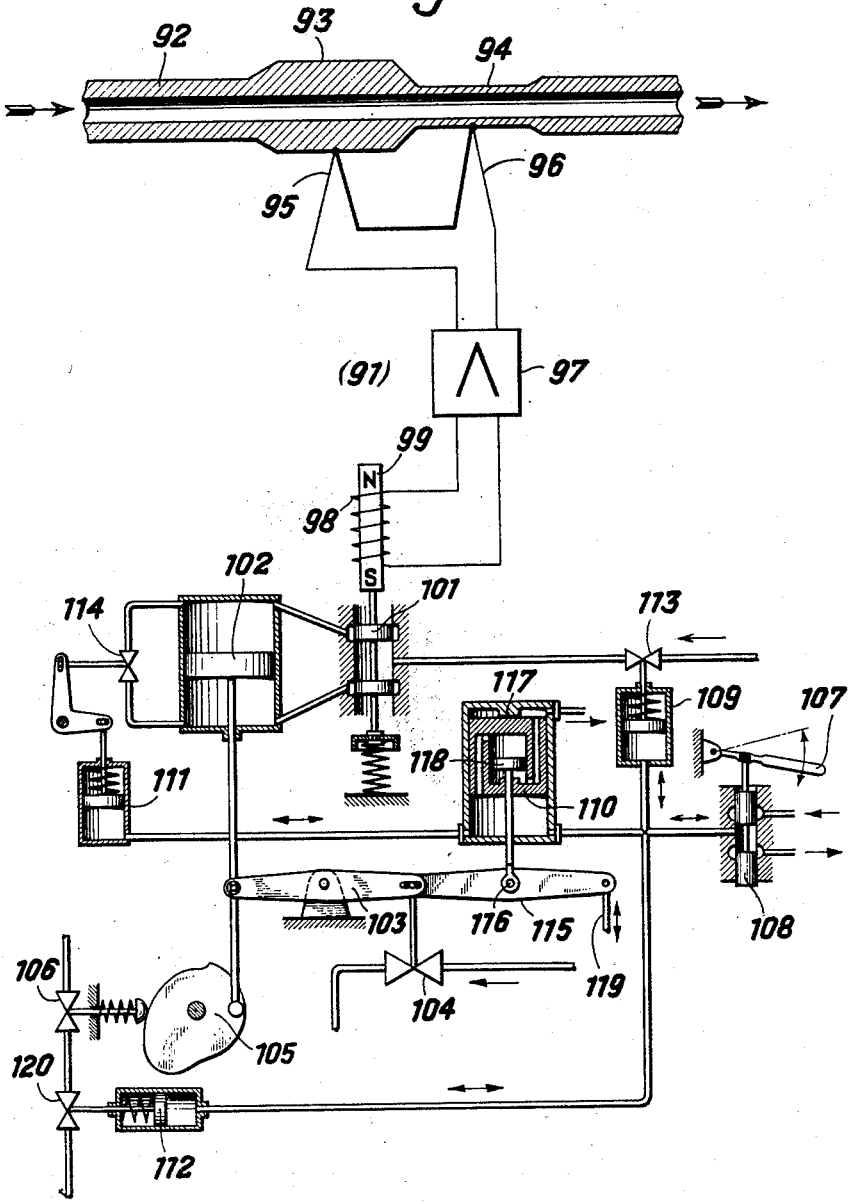
Figure 6:
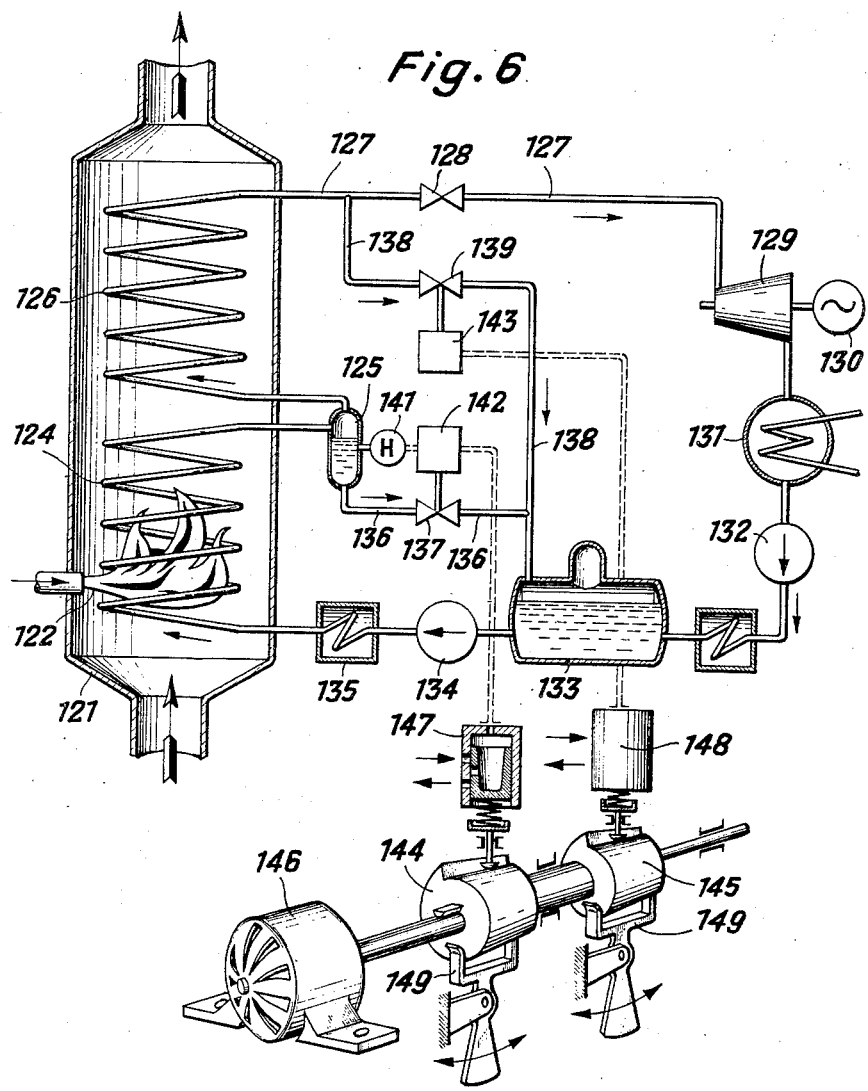
Figure 7:
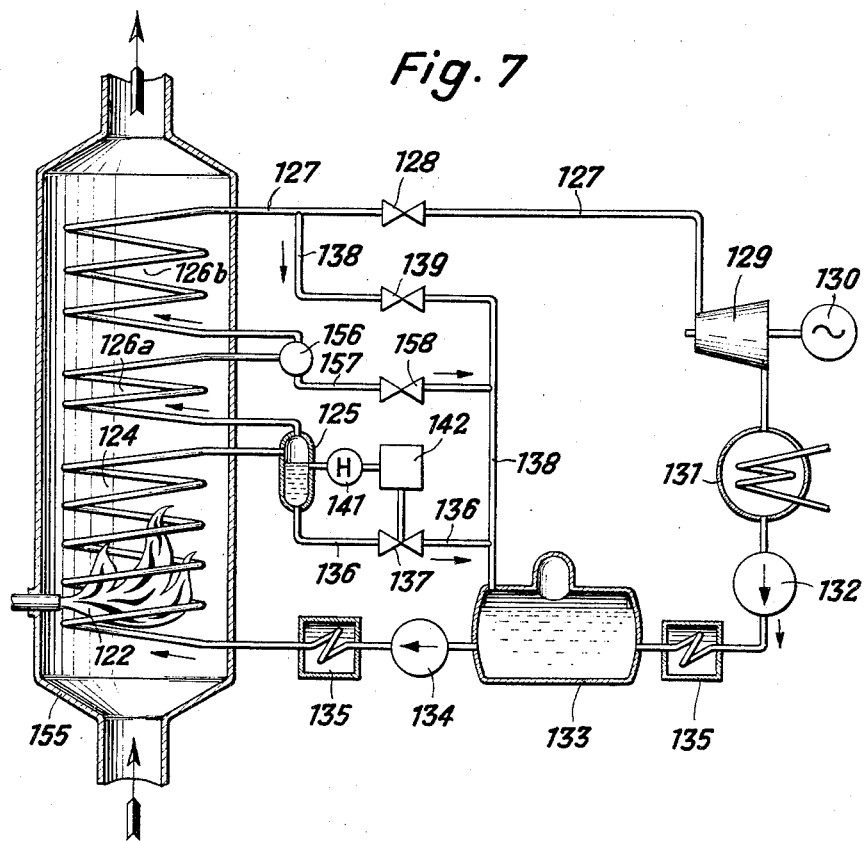

Exemplified embodiments of the invention are illustrated diagrammatically in the drawing, in which:

FIG. 1 shows an installation for transmitting heat of a general nature,

FIG. 2 is a graph showing the curves of the temperature during startup and shutdown of a typical heat generator and showing the desired limiting values of the rate of change of temperature, FIG. 3 shows an installation for the exchange of heat, with a bypass, FIGS. 4 and 5 show regulating devices, FIGS. 6 and 7 show forced-through-flow steam generators, FIG. 8 shows a forced-through-flow steam generator for super-critical pressure.

The installation for transmission of heat in FIG. 1 is of a general nature. Only the parts required to explain the process are shown.

The tube system or channel 10 comprises two parts 11 and 12 in series. The channel 10 is fed from the feed unit 13 with a medium which during operation is heated by the heat source 14. The heated medium is then sent through a line 15 having a shut-off valve 16 to a consumer system of any desired kind. In the case of a steam generator, the tube system 10 is fed with feed water by means of a pump 13. In the case of a gas-turbine installation with a closed cycle, the tube system is fed with air and the unit 13 takes the form of a compressor.

The two parts 11, 12 are of different materials according to the different levels of their operating temperatures. It is assumed that when the installation is started up and, especially, when it is shut down, the part 12 constitutes the heat exchange surface which requires special control of rate of temperature change because of the material used, for example austenitic steel. Outlet conduits 17, 18 with valves 19 and 20 are therefore provided in the lines upstream and downstream of part 12.

The heat source 14 is, for example, a furnace, which is not shown in detail. The heat source may also comprise a gas heated to high temperature from a working process as from a blast furnace, or an electrical resistance heating system or the like may be used. In the case of a steam generator, water is brought to evaporation temperature and evaporated in the part 11, while, for example, superheating is effected in the part 12 by further supply of heat.

The heat exchange surface 12, which is controlled according to the invention, has a measuring device 22 which measures the time rate of change of temperature $(dT/dt)$ and supplies to the regulating device 23 a signal on the basis of which the device 23 adjusts the valves 19, 20 by way of the signal lines 24, 25. The temperature measuring device 26 measures the temperature (T) of the heat exchange surface 12 and likewise feeds a signal to the regulating device 23. Control of the rate of temperature change of the heat exchange surface 12 may, of course, be effected by one of the devices instead of both devices 22 and 26 simultaneously. Depending upon requirements and conditions in each individual case, this may either be the device 22 for the measurement of rate of change of temperature or the device 26 for measurement of the temperature of heat exchange surface 12.

When the installation is shut down, the procedure is as follows. The heat source 14 is put out of operation, and the consumer network is disconnected by closing the valve 16. The medium fed by the unit 13 now serves to cool the heat exchange surface 12.

The valves 19, 20 are opened and a discharge is effected in each case through the lines 17, 18 upstream and downstream of the heat exchange surface 12 to be controlled. In these circumstances the regulator 23 is put into operation and is controlled by the signal or signals transmitted by the measuring device 22 and the measuring device 26 to adjust the flow of medium in the part 12, either continuously with change in the controlling quantities T or $dT/dt$, or in a discontinuous step-by-step fashion upon change in those quantities.

In the graph shown in FIG. 2 the temperature (T) of the surface 12 is plotted against the time $(t)$. Starting from the operating temperature $(T_B)$, the temperature curve 28 drops as cooling progresses. The slope of the curve 28 at each point thereof is an indication of the instantaneous rate of change of temperature $(dT/dt)$. Owing to the nature of the material of which part 12 is made, and other factors, a certain value of $(dT/dt)$ must not be exceeded. In FIG. 2 the boundary lines 29 and 30 are for $T/dt$ maximum and minimum; in consequence the inclination of the curve tangents must lie between these limits. A greater rise will give too abrupt heating and a steeper drop a too abrupt cooling of the material. Both are injurious, especially when the part 12 consists of temperature-sensitive steel. The boundary lines 29 and 30 may have the same or different angles of inclination to the horizontal.

The temperature curve 28, FIG. 2, which constitutes only an example, first drops steeply, then even rising somewhat. This may occur when the hot walls of the furnace chamber effect a more intensive radiation of heat in the part 12 upon a reduction in the rate of flow of working substance through the heat exchange surface 12.

On the one hand, the discharge by way of the line 17, and on the other hand, the discharge by way of the line 18 serve to control the magnitude and speed of flow in the part 12. By controlling the valves 19, 20 the regulator 23 regulates the flow in the part 12 in such manner that at no part of the curve 28 does the slope of the curve exceed the inclination of the boundary lines 29 and 30. In consequence of the outlet 17 the flow in the part 12 is independent of the quantity of medium caused to flow through the part 11 for the purposes of cooling the latter. The quantity flowing through the controlled part 12 depends on the pressure upstream of and the pressure downstream of that part. These pressures are obtained by appropriate adjustment of the outlets 17, 18 by means of the valves 19, 20.

The temperature measuring device 26 operates on the regulator 23 so as to control the temperature T irrespective of the instantaneous value of rate of change of temperature so as to prevent the temperature from exceeding a maximum safe limit indicated as $T_{max}$ in FIG. 2. To this end, when the temperature rises to the value $T_{max}$, the openings of the valves 19 and 20 are reduced and increased respectively.

The curve 31 shows the variation of temperature with time when the installation is started up. The slope of the curve 31 should not exceed the limits indicated by the lines 29, 30. The regulation by means of the regulator 23 is operative until the operating temperature $T_B$ is reached.

In FIG. 1 at least one outlet is provided in the tube system 10 both upstream and downstream of the heat exchange surface formed by the tube section 12 of which the rate of change of temperature is being limited in accordance with the invention. However a plurality of such outlets may be provided at either the upstream or downstream end of the tube section 12, or at both ends thereof. The outlet 21 with the valve 21a is connected upstream of the downstream end of the wall part 12 to be controlled, while the outlet 17 is connected at the upstream end and the outlet 18 at the downstream end of the part 12. The outlet 27 with the valve 27a is connected to the part 11, so that between this connection and the upstream end of the part 12 to be controlled a length of tubing 11a is incorporated which fulfils the following purpose.

A certain interval of time elapses before the outlet 17 comes fully into operation and hence before the quantity of cooling medium flowing through the tubing 12 is reduced to the magnitude adapted to the conditions of the part 12. During this period of time the upstream end of the part 12 may, for example, be overflooded with excessively cold medium and suffer damage.

If, on the other hand, the regulator 23 opens the valve 27a by way of the signal line 27b, the balance of the cooling medium flowing through tubing 11 which is not discharged at 27 enters the end 11a of the tubing 11, causing no damage, since the material of this part is not sensitive to temperature. This cooling medium then absorbs heat and passes with a somewhat higher temperature into the part 12. The outlet 27 may be used instead of the outlet 17, or it may be provided concurrently with the latter. The measuring device 32 measures, for example, the temperature of the medium flowing through tubing 11 upstream of the outlet 27 and influences the regulator 23, which opens the valve 27a. Instead of the temperature, the measuring device 32 may measure the quantity of liquid medium at its point of connection into tubing 11 and by way of the regulator 23 open the valve 27a and fully close the valve 20, so that no liquid medium passes into the part 12. For certain cases, an inlet line 33, for example of steam from another steam generator, may be provided. The inlet line 33 is regulated by means of the valve 33a under control of the regulator 23 by way of the signal line 33b.

A tube system, consisting of the sections 36, 37, 38, may be provided in the housing 35, FIG. 3, of a heat exchanger. The tube system 36 to 38 is subjected to the flow of a gaseous medium, for example, which enters and leaves through the connections 39, 42. A liquid medium for example flows through the tube system 36 to 38 and is supplied by means of the pump 43. When the valves 46, 47, 48 are opened, the medium flows through the sections 37 and 38 and through the outlet line 49 to the consumer network.

The outlet 51 is provided between the sections 36 and 37 while between the sections 37 and 38 there is provided an outlet 52 with a constriction 50 limiting the maximum flow therethrough.

In the section 36 there are provided a throttle valve 46, a measuring device 53 for the temperature (T) and, separately, a chronometer 53a. The bypass 54 connects the lines 44 and 51, and can be regulated by means of the valve 55 together with the valve 46 manually, according to the change of temperature per unit of time. The temperature measuring device 53 is read periodically at the end of a certain interval of time read off from the chronometer 53a.

The tubing section 37 is likewise provided with a throttle valve 47 and a bypass 56 with a valve 57. The valves 47 and 57 are adjusted by a programme regulating device 58. The drum 58 is driven by the electric motor 59 and has on its wall two contact cams 60 and 60a, which cooperate with the contact bars 61 and 61a. The valves 47 and 57 are connected to the contact bars 61, 61a. On rotation of the drum 58 the points of contact between the contact cam 60 and the contact bar 61 and between cam 60a and bar 61 shift. According to the magnitude of the change of effective resistance of the contact bars 61, 61a in circuit, when the contact point moves upward, the valves 47, 57 are operated. By changing the contact cams 60, 60a on the drum 58 the valves 47, 57 may be adjusted in accordance with a different programme. Moreover the motor 59 may be controlled, for example, by the temperature of the gas flowing through the housing 35.

The section 38 can be short-circuited by means of the bypass 62 with the valve 63. The measuring device 64 measures the rate of change of temperature gradient ($dT/dt$) and passes a signal to the regulator 65. By way of the signal lines 66 and 67 the regulator 65 controls the valves 48 and 63. The consumer network is disconnected from the tube system 36 to 38 by means of the valve 68 during the starting and stopping period. The circulation of cooling medium is however continued during start-up and shut-down notwithstanding closure of the valve 68, as by the opening of a valve 49' in a by-pass line 49.

While the outlets 17, 18, FIG. 1 withdraw medium from the tube system 10, for example into the starting tank, into the condenser or entirely discharge the same, the bypasses also act as outlets, but carry the medium to the next part, bypassing the part to be controlled.

FIG. 4 illustrates one form which the apparatus 64 and 65 of FIG. 3 may take for control of the valves 48 and 63 in FIG. 3. In FIG. 4 a measuring tube 72 is fastened at 71 and bathes in the medium whose rate of change of temperature is to be measured. The tube 72 has an eccentric bore 73 which may be equally well disposed eccentrically on the inside instead of on the outside of the bent tube. The tube loop 74 is embraced by the clamp 75, which is connected to the measuring spring 76. The movement of the loop 74 is transmitted by the spring 76 to the bell 77 and by the admission and discharge of pressure oil by means of the lines 70 is converted into a pressure signal which acts on the slide 78.

The required value for the rate of change of temperature is given by the initial tension of the spring 79. The tension of the spring 79 can be altered by means of the hand wheel 81. If the rate of change of temperature does not correspond to the required value, the servo-motor piston 82 moves, and in the first instance operates the valve 63, FIG. 3, by way of the angle lever 83. If the valve 63 is nearly open, the horizontal arm of the angle lever 83 begins to press the push rod 84 down against the action of the compression spring 85 and thus close the valve 48, FIG. 3. The elements 72—77 of FIG. 4 measure $dT/dt$ in view of the eccentric location of the bore 73 in tube 72. The walls of the tube 72 are therefore of non-uniform thickness and respond with unequal speed to temperature changes. In consequence the bending of the tube varies and this constitutes a measure of the rate of change of temperature in the medium to which the tube 72 is exposed.

The pressure fluid for the servo-motor 82 is supplied at the supply line 86 under pressure, while the discharge is effected from the container 87, the overflow of which determines the regulating pressure. The apparatus of FIG. 4 thus constitutes a servo mechanism, employing the energy from the source (not shown) which supplies hydraulic fluid under pressure to the line 86, to adjust the valves 48 and 63 of FIG. 3 in accordance with the time rate of change of temperature (measured by the tube 63) and in accordance with the setting of hand wheel 81.

If the valve 63 is used for other purposes, the piston 82 can move freely by the opening of the valve 88, irrespectively of the position of the measuring tube 72.

FIG. 5 shows a measuring device 91 for measuring the rate of change of temperature, using electrical means in conjunction with a length of tube 92 through which the medium flows. The said length of tube 92 has a thickened part 93 and a thinner part 94, each provided with a thermocouple 95, 96. The thermocouples 95, 96 are connected in series. The difference voltage corresponding to the rate of change of temperature is amplified in the amplifier 97 and passed to a fixed coil 98. In the coil 98 a permanent magnet 99 is disposed to be slidable against a compression spring connected to the slide 101. The latter controls the servo-motor piston 102, from which by way of the two-armed lever 103 the valve 104 is operated and from which further by way of the cam 105 the valve 106 is operated. The valves 104 and 106 correspond, for example, to the valves 19 and 20 in FIG. 1. The difference in temperatures to which the thermo-couples 95 and 96 are exposed is a measure of the rate of change of temperature because of the unlike heat capacity of the tube sections 93 and 94 of unlike thickness. Upon a change of temperature in the medium flowing through pipe 92, this change affects thermocouple 96 sooner than it does thermo-couple 95. The greater the difference in temperatures between 95 and 96 the greater the rate of change of temperature. Valves 104 and 106 do not completely open or close because variation in the opening of these valves affects the flow through line 92. This variation in flow is perceived by the thermo-couples 95 and 96 which provide a feed back signal via correction at slide 101 and control piston 102.

The valve 104 may in addition also be used for other purposes in the operating phase of startup and shutdown. If the lever 107 is lifted, the slide 108 opens the pressure oil admission for the servo-motor pistons 109, 110, 111, 112, which move against the action of the compression springs. In consequence, the following occurs. The admission of pressure oil to the servo-motor 102 is stopped by closing of the valve 113. In addition, the piston 102 becomes freely movable by the opening of the valve 114. At the same time, the two-armed lever 115 receives a fixed pivot point 116, in view of the fact that the hollow piston 110 is pressed against the stop 117, and the piston 118 against the piston 110. The valve 104 can now be operated by the supplementary control 119 instead of by the piston 102. If, for example, in FIG. 1, the valve 27a were controlled like the valve 104, the control 119 could be operated in dependency on the measuring device 32 of FIG. 1.

By the operation of the servo-motor 112 the valve 120 preceding the throttle element 106 is closed. Conversely, the valve 120 could be installed in a bypass to the valve 106 and be opened by the movement of the servo-motor piston 112.

The forced-through-flow steam generator 121, FIG. 6, with the furnace 122, has in the lower end thereof an evaporator 124, which leads to the separator 125 in which the liquid and gaseous phases are separated. The latter flows through the superheater 126 and passes by way of the main steam line 127 with the shut-off valve 128 to the turbine 129, the low-pressure part of which is connected to the condenser 131 and which drives the electric generator 130. The condensate is fed to the starting and storage vessel 133 by means of the condensate pump 132, and passes from said vessel by means of the feed pump 134 through the heat exchanger 135 into the economiser (not shown) and from there to the evaporator 124.

The water withdrawal line 136 with its valve 137 is connected to the separator 125 in the usual manner. From the main steam line 127 there branches off the starting by-pass line 138 with the shut-off valve 139, and line 138 is connected to the starting vessel 133. The separating valve 137 is controlled in known manner by the water-level responsive regulator 141 of the separator 125, valve 137 being open for a level of liquid in the separator 125 at or above a predetermined level.

The servo-motor 142 of the water separator valve 137, and the servo-motor 143 for the starting line valve 139 are adjusted by a programme control, which controls the startup of the boiler in the manner already described in FIG. 1, in order that sensitive parts of the heated tube system, for example of austenitic steel, do not undergo damage. For this programme control the function rollers 144, 145 are driven by the synchronous motor 146. In consequence, predetermined pressure signals are fed to the servo-motors 142, 143, these signals being correlated according to the programme selected. The function rollers 144, 145 operate the slides 147, 148 for the pressure medium flow to the pistons of the servo-motors 142, 143, which move accordingly. These function rollers 144, 145 are individually axially adjustable by means of forks 149, so that before start-up they can be adjusted according to the load conditions prevailing.

Since the forced-through-flow steam generator 155 shown in FIG. 7 contains the same parts as in FIG. 6, they have been given the same reference numerals. From the separator 125 the steam passes into a first superheater 126a and from there into the collector vessel 156, which may likewise be constructed as a separator, and to which the second superheater 126b is connected. From the collector vessel 156 the line 157 with the valve 158 leads to the by-pass line 138 and starting vessel 133.

In FIG. 6, the superheater 126 constitutes that part of the heat exchange surface in the entire tube system to be controlled as to rate of change of temperature in accordance with the invention. Upstream of superheater 126 the water separator line 136 serves as an outlet and downstream of it the line 138 also serves as an outlet.

In FIG. 7, the first superheater 126a and the second 126b may constitute separate heat exchange surfaces (of tubular or channel shape) of the steam generator 155 to be controlled separately from each other, since an outlet or discharge channel is provided upstream of and downstream of each of these surfaces by way of the separating vessel 125, the collector vessel 156 and by way of the starting line 138. The control of the outlet valves 137, 158, 139 is in each case effected in accordance with the requirements for the cooling of the surfaces in question by the flow.

Alternatively, the superheater 126a alone or the superheater 126b alone may constitute the heat exchange surface to be protected. Nevertheless, the outlet may be effected by way of the separating line 136 and by way of the starting line 138, even if the first superheater 126a requires no control at all.

The forced-through-flow steam generator 170, FIG. 8, for super-critical pressures, has a converter 171, which is connected to the economiser 172 accommodated in the smoke gas flues. The feed water supply from the starting vessel 133 is the same as in FIGS. 6 and 7, and the same applies to the steam supply to the turbine 129.

A collector vessel 173 is connected to the converter 171 and is connected on the one hand to the first superheater 174 and on the other hand by means of the line 176 with the valve 177 to the starting vessel 133. Whereas the first superheater 174 is disposed upstream of the converter 171, the second superheater 178 is downstream of the part 171, with respect to the direction of travel of the smoke gases.

The loop 175 is taken out at any point of the first superheater 174 and the measuring device 179 is connected to that loop. It measures the rate of change of temperature $dT/dt$ at this point and passes to the regulator 180 by way of the signal line 181 a signal which according to a predetermined programme adjusts the servo-motors 182, 183 for the valves 139, 177 and hence on start-up and shut-down regulates the discharges through the lines 176, 138 and the flow in the superheaters 174, 178.

If the water in the starting vessel is too hot, the starting line 138 can be connected to the condenser 131 by closing of the valve 184 and opening of the valve 185. A water injection 186, fed by the condensate pump 132, limits this temperature.

The connection of the outlets may also be effected in the middle of a boiler part instead of at the beginning or end, and depends on the extent of the heat exchange surface to be protected against excessive rate of change of temperature. The temperature of the medium in the part to be controlled may also be used to regulate the discharges, for example in the manner of a feed forward action from the temperature.

For the valves 137, 158, 139 in FIGURE 7 or 177 and 139 in FIGURE 8, the regulating devices as shown in FIGURES 4, 5 or 6 may be used.

I claim:

1. In the starting up and shutting down of a heat transfer system, the method of operating a heat exchanger in said system having a heat exchange surface exposed on one side to a variable source of heat and exposed on its other side to a heat absorbing medium flowing through a channel defined in part by said surface and having outlet ports upstream and downstream of said surface which comprises measuring the time rate of change of temperature of said surface, decreasing the opening of said upstream port and increasing the opening of said downstream port upon rise in said rate above an upper limiting value, and increasing the opening of said upstream port and decreasing the opening of said downstream port upon fall in said rate below a lower limiting value.

2. In the starting up and shutting down of a heat transfer system, the method of operating a heat exchanger in said system having a heat exchange surface exposed on one side to a variable source of heat and exposed on its other side to a heat absorbing medium flowing through a channel defined in part by said surface and having outlet ports upstream and downstream of said surface, which comprises measuring the time rate of change of temperature of said medium adjacent said surface, decreasing the opening of said upstream port and increasing the opening of said downstream port upon rise in said rate above an upper limiting value, and increasing the opening of said upstream port and decreasing the opening of said downstream port upon fall in said rate below a lower limiting value.

3. Heat exchange apparatus comprising a first channel bounded at least in part by a heat exchange surface exposed to a variable source of heat exteriorly of said channel, means to drive a heat absorbing medium through said channel, separate discharge channels connecting into said first channel upstream and downstream of said heat exchange surface in the sense of flow of said medium through said first channel, a valve in each of said discharge channels, means to measure the time rate of change of temperature of said surface, and servo mechanism responsive to said rate coupled to said valves to decrease the opening of the upstream valve and to increase the opening of the downstream valve upon rise in said rate above an upper limit, and to increase the opening of the upstream valve and to decrease the opening of the downstream valve upon fall in said rate below a lower limit.

4. Heat exchange apparatus comprising a first channel bounded at least in part by a heat exchange surface exposed to a variable source of heat exteriorly of said channel, means to drive a heat absorbing medium through said channel, separate discharge channels connecting into said first channel upstream and downstream of said heat exchange surface in the sense of flow of said medium through said first channel, a valve in each of said discharge channels, means to measure the time rate of change of temperature of said medium adjacent said surface, and servo mechanism responsive to said rate coupled to said valves to decrease the opening of the upstream valve and to increase the opening of the downstream valve upon rise in said rate above an upper limit, and to increase the opening of the upstream valve and to decrease the opening of the downstream valve upon fall in said rate below a lower limit.

5. A steam generator comprising a variable source of heat, a steam tube channel including series-connected evaporator and superheater portions, a feed water pump connected to said evaporator portion, separate discharge channels connected into said steam tube channel upstream and downstream of said steam superheater portion, a valve in each of said discharge channels, means to measure the time rate of change of temperature in said superheater portion, and means responsive to said measured time rate of change of temperature coupled to said valves to decrease the opening of the upstream valve and to increase the opening of the downstream valve upon rise in said rate above an upper limit, and to increase the opening of the upstream valve and to decrease the opening of the downstream valve upon fall in said rate below a lower limit.

References Cited in the file of this patent

UNITED STATES PATENTS

| 1,914,604 | Keenan et al. | June 20, 1933 |
| 2,413,128 | Wills | Dec. 24, 1946 |
| 2,498,637 | Bay | Feb. 28, 1950 |
| 2,555,250 | Schroeder | May 29, 1951 |
| 2,858,807 | Stange | Nov. 4, 1958 |

FOREIGN PATENTS

| 1,056,147 | Germany | Apr. 30, 1959 |